United States Patent [19]

Pfarrer

[11] 4,082,989

[45] Apr. 4, 1978

[54] SWITCHING CONTACTOR CIRCUIT FOR FIVE-LEAD TWO-SPEED SINGLE-PHASE MOTOR

[75] Inventor: David M. Pfarrer, Hurst, Tex.

[73] Assignee: Lennox Industries, Inc., Marshalltown, Iowa

[21] Appl. No.: 648,623

[22] Filed: Jan. 13, 1976

[51] Int. Cl.² .............................................. H02P 1/44
[52] U.S. Cl. ............................. 318/224 A; 318; 221 D
[58] Field of Search ............... 317/13; 318/221; 221 A, 318/221 D, 221 R, 224, 224 A, 318/224 R, 225 R, 270 B

[56] References Cited

U.S. PATENT DOCUMENTS

| 3,978,382 | 8/1976 | Pfarrer et al. | 318/224 A |
| 2,813,239 | 11/1957 | La Cour | 318/224 A |
| 2,817,050 | 12/1957 | La Cour | 318/224 A |

Primary Examiner—Herman J. Hohauser
Attorney, Agent, or Firm—Allegretti, Newitt, Witcoff & McAndrews

[57] ABSTRACT

A motor control circuit for a single-phase two-speed five-lead motor which includes main windings, high speed start windings, and low speed start windings. The circuit includes high speed contactor means, low speed contactor means, a start capacitor means, run capacitor means and start relay means. The start capacitor means include a first start capacitor and a second start capacitor in parallel therewith. The start relay means include a start relay coil and a normally closed contact that is disposed between the start windings and the start capacitors. During the high speed mode of operation, both start capacitors are in the circuit until the start relay contact is opened. During the low speed mode of operation, only one start capacitor is in the circuit until the start relay contact is opened. By means of the improved motor control circuit, only a single start relay is needed to control operation of the single-phase two-speed five-lead motor.

9 Claims, 2 Drawing Figures

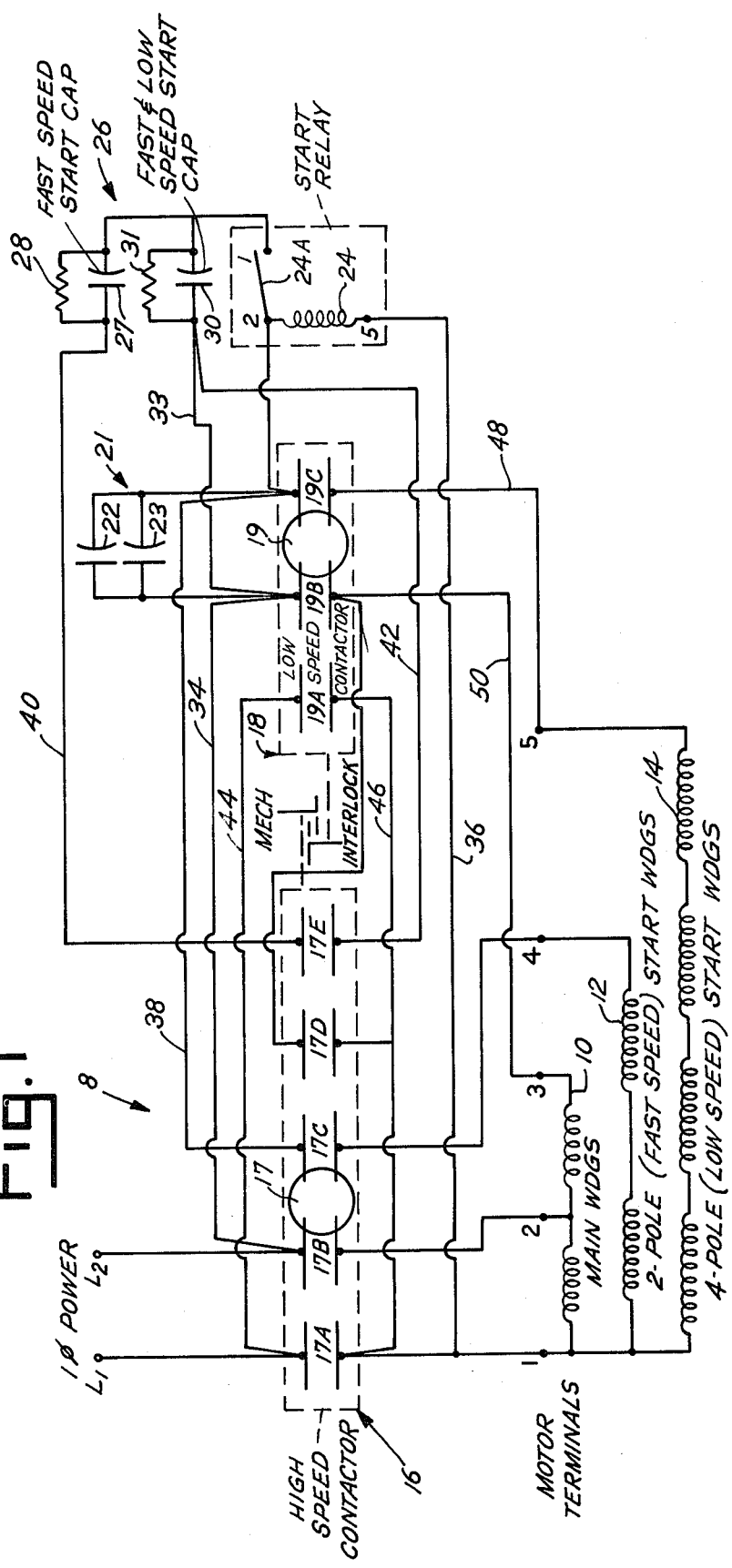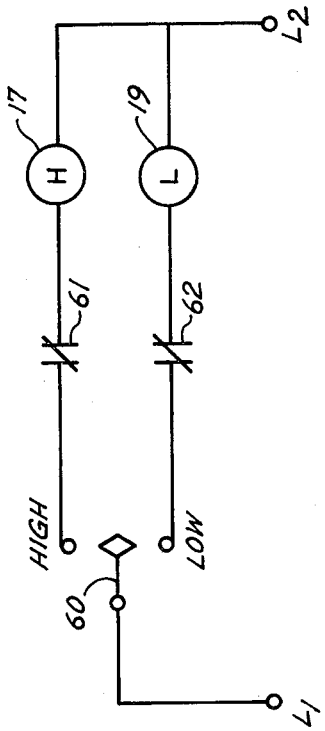

SWITCHING CONTACTOR CIRCUIT FOR FIVE-LEAD TWO-SPEED SINGLE-PHASE MOTOR

BACKGROUND AND SUMMARY OF THE INVENTION

This invention relates to a single-phase two-speed five-lead motor for use in hermetic refrigerant compressors.

In applying a single-phase two-speed five-lead motor for certain hermetic refrigerant compressor applications, it was found that the starting characteristics for both high speed and low speed were not suitable for use of a common start capacitance and start relay means. Redesign at the start windings of the motor to allow use of a single start capacitance and a single start relay without decreasing the motor running performance was found to be a substantial design problem as well as a material cost problem.

The present invention provides a solution to the problem by providing appropriate combinations of start capacitance—one value for the low speed mode of operation and another value for the high speed mode of operation.

An object of this invention is to provide an improved motor control circuit for a single-phase two-speed five-lead motor which does not necessitate alteration of the motor windings and which is relatively simple and inexpensive to apply to an existing motor.

Another object of the present invention is to provide a motor control circuit for a single-phase two-speed five-lead motor which incorporates a high speed start capacitor and a low speed start capacitor in parallel therewith, with start relay means including a start relay coil and a normally closed contact disposed between the start windings and the start capacitors such that during high speed motor operation, both start capacitors are in the circuit until the start relay contact is opened, and during low speed operation, only the low speed start capacitor is in the circuit until the start relay contact is opened.

Other objects and advantages of the present invention will be made more apparent hereinafter.

BRIEF DESCRIPTION OF THE DRAWING

There is shown in the attached drawing a presently preferred embodiment of the present invention, wherein:

FIG. 1 is an electrical schematic diagram of a motor control circuit embodying the principles of the present invention; and FIG. 2 illustrates a partial electrical control circuit illustrating the high speed contactor coil, low speed contactor coil, the safety interlock contacts and the control switch.

DETAILED DESCRIPTION OF THE PRESENT INVENTION

Referring now to FIG. 1, there is illustrated a motor control circuit 8 embodying the principles of the present invention. Power from a suitable source, for example, single-phase sixty cycle 208-230 volt power is supplied to the lead lines L1 and L2.

Provided in the circuit to the motor which includes the main windings 10, two-pole high speed start windings 12 and the four-pole low speed start windings 14 are high speed contactor means 16 and low speeed contactor means 18. The motor has five terminals or leads numbered 1-5, respectively. The high speed contactor means 16 includes high speed contactor relay coil 17 and five normally open contacts, 17A, 17B, 17C, 17D and 17E.

The low speed contactor means 18 includes a low speed contactor relay coil 19 and three normally open contacts 19A, 19B, and 19C. The high speed contactor means 16 and the low speed contactor means 18 are mechanically and electrically interconnected so that only one or the other may be operative at one time. The mechanical interlock means 25 are shown schematically in FIG. 1. The electrical interlock means are described hereinafter in connection with FIG. 2. Run capacitor means 21 are provided in the circuit as shown. The run capacitor means may comprise a first run capacitor 22 and a second run capacitor 23, as shown, or a single run capacitor might be used.

Also included in the motor control circuit is a start relay means 24 including a normally closed start relay contact 24A.

Start capacitor means 26 include a first start capacitor 27 with a bleed resistor 28 in parallel thereto and a second start capacitor 30 with a bleed resistor 31 in parallel therewith. In one form of the present invention, the capacitor 27 is 88 microfarads 320 VAC and the capacitor 30 is 135 microfarads 320 VAC.

Consider first the operation of the motor during the high speed mode of operation. The high speed contactor coil 17 is energized and the contacts 17A, 17B, 17C, 17D and 17E are closed. A circuit is completed to the two-pole high speed start windings 12 via the lead line L1, contact 17A, terminal, windings 12, terminal 4, contact 17C, line 38, contact 24A, start capacitor 30, and lines 33 and 34 to the lead line L2. At the same time a circuit is completed to the start capacitor 27 via the lead line L1, contact 17A, terminal 1, two-pole start windings 12, terminal 4, contact 17C, line 38, contact 24A, start capacitor 27, line 40, contact 17E, line 42, line 33, line 34, and lead line L2. The main windings 10 are energized via the lead line L1, contact 17A, main windings 10, contact 17B and lead line L2.

During acceleration of the motor, the voltage will increase in the start windings and upon attainment of a predetermined voltage value, the start relay coil 24 will be energized via lead line L1, line 36, relay coil 24, start capacitor 30, line 33, line 34, and lead line L2, whereby the contact 24A will be opened and the start capacitor means including both start capacitors 27 and 30 will be removed from the circuit.

During the low speed mode of motor operation, the low speed contactor means 18 will be energized and the high speed contactor means will not be energized. Thus, the normally open contacts 17A, 17B, 17C, 17D and 17E will remain open and the contacts 19A, 19B and 19C will be closed. A circuit is completed to the four-pole low-speed start windings 14 via the lead line L1, line 44, contact 19A, line 46, terminal 1, four-pole low-speed start windings 14, terminal 5, line 48, contact 19C, contact 24A, start capacitor 30, line 33, line 34 and lead line L2. The main windings 10 will be energized at this time via the lead line L1, line 44, contact 19A, terminal 1, main windings 10, terminal 3, line 50, contact 19B, line 34, and lead line L2.

When the voltage in the start windings 14 reaches a predetermined value during acceleration of the motor, the start relay coil 24 will be energized and the contact 24A will be opened so as to remove the start capacitor 30 from the circuit. During the low speed mode of motor operation, the start capacitor 27 is not operative since the contact 17E of the high speed contactor means in circuit therewith is open at this time.

The following table will help summarize the operative connections of the motor terminals during high speed and low speed operation of the induction motor:

|  | L1 | L2 | Start | Open | Connection Pole |
|---|---|---|---|---|---|
| High Speed | 1,3 | 2 | 4 | 5 | 2 |
| Low Speed | 1 | 3 | 5 | 2,4 | 4 |

Turning now to FIG. 2, there is shown a control circuit for the high speed contactor relay coil 17 and the low speed contactor relay coil 19. Included in the control circuit is a control switch 60, which is adapted to be moved selectively to either a High position or a Low position. In the leg of the circuit between the High contact and the high speed contactor coil is a normally closed low speed interlock 61. Disposed between the Low contact and the low speed contactor coil 19, is a normally closed high speed interlock 62. When it is desired to actuate the motor for high speed operation, the switch 60 may be moved to the High position, either manually or by an appropriate control, so as to complete a circuit from lead line L1 through switch 60, normally closes low speed interlock 61, high speed contactor coil 17 and lead line L2. Upon energization of the high speed contactor coil 17, the high speed interlock 62 will be opened. This provides an electrical interlock to assure that the low speed contactor coil cannot be energized. The operation of the improved motor control circuit 8 of this invention will be as described above.

In the event the low speed mode of operation is desired, then the switch 60 is moved into a position in engagement with the Low contact and the circuit is completed from lead line L1, through switch 60, normally closed high speed interlock contact 62, low speed contactor coil 19 and lead line L2. The low speed interlock 61 is opened upon energization of the coil 19 so as to provide an electrical interlock to prevent undesired energization of the high speed contactor coil 17.

There has been provided by the present invention an improved motor control circuit for a single-phase two-speed five-lead motor which incorporates start capacitance means which provides one value for low speed operation and another value for high speed operation, without complicating the switching of the circuit. By properly selecting the two start capacitors and orienting same relative to the start relay means, only a single start relay is required and there is no necessity for altering or redesigning the start windings of the electric motor.

While I have shown a presently preferred embodiment of the present invention, it will be apparent to those skilled in the art that various modifications may be made thereto without departing from the invention.

I claim:

1. A motor control circuit for a single-phase two-speed motor including main windings, high speed start windings and low speed start winding, said circuit including high speed contactor means, low speed contactor means, start capacitor means, run capacitor means, and start relay means, with the improvement characterized by said start capacitor means including a high speed start capacitor and a low speed capacitor in parallel therewith, said start relay means, including a start relay coil and a normally closed contact disposed between the start windings and the start capacitors, whereby during high speed motor operation, both start capacitors are in the circuit until the start relay contact is opened, and during low speed motor operation only the low speed start capacitor is in the circuit until the start relay contact is opened.

2. A circuit as in claim 1 wherein a bleed resistor is disposed in parallel about each start capacitor.

3. A circuit as in claim 1 wherein the start relay coil is responsive to the voltage of the start windings and will be energized at a predetermined value during acceleration of the motor to open the normally closed start relay contact and thereby remove the high and low speed start capacitors during the high speed mode of operation or remove the low speed start capacitor during the low speed mode of operation.

4. A circuit as in claim 1 wherein the high speed contactor means and the low speed contactor means are mechanically interlocked.

5. A circuit as in claim 1, wherein the high speed contactor means includes five normally open contacts.

6. A circuit as in claim 5 wherein the low speed contactor means includes three normally open contacts.

7. A circuit as in claim 6 including a power source and a control switch for selectively energizing the high speed contactor coil or the low speed contactor coil so as to close the respective normally open contacts and operate the motor in either a high speed mode or a low speed mode.

8. A circuit as in claim 1 utilizing a single start relay coil and start relay contact for controlling the high speed capacitor means and the low speed capacitor means without redesign of the motor windings or adversely affecting motor performance.

9. A circuit as in claim 4 wherein the high speed contactor means and the low speed contactor means are electrically interlocked.

* * * * *